(12) United States Patent
Ng et al.

(10) Patent No.: US 8,960,448 B2
(45) Date of Patent: Feb. 24, 2015

(54) THIN FILM COMPOSITE OSMOSIS MEMBRANES

(71) Applicant: National University of Singapore, Singapore (SG)

(72) Inventors: How Yong Ng, Singapore (SG); Wei Duan, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 13/727,211

(22) Filed: Dec. 26, 2012

(65) Prior Publication Data

US 2013/0105384 A1 May 2, 2013

Related U.S. Application Data

(63) Continuation of application No. PCT/SG0212/000249, filed on Jul. 13, 2012.

(30) Foreign Application Priority Data

Sep. 22, 2011 (SG) .............................. 201106934-1

(51) Int. Cl.
| | |
|---|---|
| *B01D 63/00* | (2006.01) |
| *B01D 71/06* | (2006.01) |
| *B01D 69/02* | (2006.01) |
| *B01D 69/12* | (2006.01) |
| *B01D 69/10* | (2006.01) |
| B01D 61/14 | (2006.01) |
| C02F 1/44 | (2006.01) |
| B01D 61/00 | (2006.01) |

(52) U.S. Cl.
CPC ............... *B01D 69/12* (2013.01); *B01D 69/10* (2013.01); *B01D 69/125* (2013.01); *C02F 1/445* (2013.01); *B01D 61/002* (2013.01)
USPC ...... 210/490; 210/650; 210/651; 210/321.72; 210/488; 210/500.21; 210/507; 264/41; 427/244; 427/245

(58) Field of Classification Search
None
See application file for complete search history.

(56) References Cited

U.S. PATENT DOCUMENTS

| | | | | |
|---|---|---|---|---|
| 4,214,994 | A * | 7/1980 | Kitano et al. ................. | 210/490 |
| 7,445,712 | B2 | 11/2008 | Herron | |
| 8,181,794 | B2 * | 5/2012 | Mcginnis et al. ........ | 210/500.38 |
| 2006/0226067 | A1 * | 10/2006 | Herron ........................... | 210/490 |
| 2012/0080378 | A1 * | 4/2012 | Revanur et al. ............... | 210/644 |
| 2012/0318729 | A1 * | 12/2012 | Yip et al. ...................... | 210/490 |

FOREIGN PATENT DOCUMENTS

| | | |
|---|---|---|
| EP | 0228248 | 7/1987 |
| WO | 2010/144057 | 12/2010 |

OTHER PUBLICATIONS

W.J. Lau and A.F. Ismail, "Progress in Interfacial Polymeriation Technique on Composite Membrane Preparation," 2011 $2^{nd}$ International Conference on Environmental Engineering and Applications, IPCBEE vol. 17 (2011) IACSIT Press, Singapore.

Robert J. Peterson, "Composite reverse osmosis and nanofiltration membranes," Journal of Membrane Science, 83 (1993) 81-150.

Changquan Qiu et al., "High performance flat sheet forward osmosis membrane with an NF-like selective layer on woven fabric embedded substrate," Desalination, Jun. 24, 2011.

* cited by examiner

*Primary Examiner* — Benjamin Kurtz
(74) *Attorney, Agent, or Firm* — Cesari and McKenna, LLP

(57) ABSTRACT

A two-layered osmosis membrane contains a support layer and a rejection layer. The support layer, in which a mesh is embedded, is made of a phase separation polymer and has a thickness of 50 to 200 μm. The rejection layer, which adheres to the support layer, is made of a thin film composite polymer and has a thickness of 0.05 to 3 μm. The mesh, which is embedded in the support layer, has an open area of 30 to 70%, a mesh size of 60-300 mesh, and a thickness of 45-150 μm. Also disclosed is a method of making the above described membrane.

28 Claims, No Drawings

THIN FILM COMPOSITE OSMOSIS MEMBRANES

CROSS REFERENCE TO RELATED APPLICATION

This application is a continuation application under 35 USC 120 of international application no. PCT/SG2012/000249, filed Jul. 13, 2012, which claims the benefit of the priority date of Singapore application no. 201106934-1, filed Sep. 22, 2011. The contents of the aforementioned applications are incorporated herein in their entirety.

BACKGROUND

Both reverse osmosis and forward osmosis have been used for water treatment.

Reverse osmosis is a pressure-driven process, requiring a high pressure exerted on a membrane. To withstand a pressure as high as 1200 psi, a reverse osmosis membrane has a dense layer of polymer matrix, which often causes fouling.

Forward osmosis, by contrast, is a process driven by diffusion instead of pressure. In a forward osmosis process, a solution of a considerably high concentration, i.e., draw solution, is utilized to generate a hydrostatic osmotic pressure gradient across a membrane to extract fresh water from a feed solution (such as seawater, brine, or any waste water) on the other side of the membrane. Since this process capitalizes natural osmosis, little energy is required.

Commercially available forward osmosis membranes, typically made of cellulose-based polymers, have unsatisfactory durability and performances. There is a need to develop a durable and highly efficient forward osmosis membrane.

SUMMARY

This invention is based on an unexpected discovery of a durable thin film composite ("TFC") membrane that has both a high water flux and a high salt rejection for forward osmosis applications.

One aspect of this invention relates to a two-layered osmosis membrane that contains a support layer and a rejection layer. The support layer, in which a mesh is embedded, is made of a phase separation polymer. It has a thickness of 50 to 200 μm (e.g., 60-180 μm, 70-160 μm, and 80-120 μm). The rejection layer, which adheres to the support layer, is made of a TFC polymer. It has a thickness of 0.05 to 3 μm (e.g., 0.06-1 μm and 0.1-0.5 μm). The mesh, embedded in the support layer, has an open area of 30 to 70% (e.g., 40-70% and 50-70%), a mesh size of 60-300 mesh (e.g., 90-250 mesh and 100-180 mesh, as measured by the U.S. Sieve Series Standards), and a thickness of 45-150 μm (e.g., 50-145 μm and 55-140 μm).

Another aspect of this invention relates to a method of preparing the just-mentioned membrane. The method includes the following steps: (i) applying a casting polymer solution to a mesh to form a casting solution layer that embeds the mesh, the casting polymer solution containing a polymer 5 to 30% by weight and a water-miscible solvent 70 to 95% by weight; (ii) coagulating the casting solution layer with a coagulation solvent to convert the casting solution layer into a support layer; and (iii) coating a surface of the support layer with a rejection layer by interfacial polymerization. The coating step can be performed by interacting an aqueous polyfunctional amine solution with an anhydrous polyfunctional acid halide solution on the surface of the support layer.

The details of the invention are set forth in the description below. Other features, objects, and advantages of the invention will be apparent from the description and from the claims.

DETAILED DESCRIPTION

This invention provides a two-layered osmosis membrane that has a high water flux and a high salt rejection. In addition to forward osmosis applications, this membrane can also be used in other applications. Specifically, the membrane can be used in osmotic-driven water purification and filtration, desalination of seawater, purification and filtration of contaminated aqueous waste water, pressure-retarded osmosis, and low-pressure-driven liquid filtration.

The membrane contains two layers, i.e., a support layer and a reject layer.

The support layer provides support for the rejection layer of the membrane. It is highly porous and has a thickness of 50-200 μm.

This microporous support layer may have an asymmetric structure along the cross-sectional direction of the membrane. More specifically, it may have a dense side and a porous side.

The support layer can be made of any suitable polymer. See J. Mulder, Basic Principles of Membrane Technology (2nd ed.); and Handbook of Industrial Membrane Technology (M. C. Porter ed., William Andrew Publishing/Noyes 1990). For example, the support layer can be made of a phase separation polymer. A phase separation polymer is a polymer that forms a porous membrane during a phase separation process, which can be induced in several ways (e.g., by changing the temperature and by changing the concentration of polymer solutions). Immersion precipitation, an example of a phase separation process, can be used to prepare a membrane of this invention. Examples of phase separation polymers include, but are not limited to, polyethersulfone, polyphenylenesulfone, polyphenylenesulfidesulfone, polyacrylonitrile, cellulose ester, polyphenyleneoxide, polypropylene, polyvinyledenefluoride, polyvinylchloride, polyarylsulfone, polyphenylene sulfone, polyetheretherketone, polysulfone, polyamide, polyimide, and a combination thereof.

The support layer contains a mesh embedded in it. The mesh has an open area of 30-70%, a mesh size of 60-300, and a thickness of 45-150 μm. The mesh can be a woven monofilament mesh or a non-woven fabric mesh. Examples of a woven monofilament mesh include, but are not limited to, polyester woven screen, polypropylene woven screen, woven acrylic, woven nylon screen, and a combination thereof. Examples of a non-woven fabric mesh include, but are not limited to, polyester, polypropylene, polyolefin blends, polyester-polyolefin composites, nylon, and a combination thereof. Note that the meshes used in membranes of this invention, unlike meshes used in reverse osmosis membranes, are porous and have high open areas.

Turning to the rejection layer that adheres to the support layer, it is made of a TFC and has a thickness of 0.05 to 3 μm. A TFC polymer is a polymer that can form an ultrathin rejection layer (less than 3 μm in thickness) on the surface of a support layer. Examples include, but are not limited to, polyamide, polyimide, cellulose ester, polyurea, polyepiamine, poly(piperazineamide), sulfonated polyfurane, sulfonated polysulfone, carboxylated polysulfone, poly(vinyl-alcohol), and a combination thereof. The ultrathin rejection layer can be formed from a TFC polymer by employing at least the following five methods: (1) dip-coating a solution of a polymer onto a support layer and drying in place, (2) interracially polymerizing a reactive set of monomers at the surface of a support layer, (3) casting an ultra-dense rejection layer film separately, then laminating it to a support layer, (4) dip-coating a solution of a reactive monomer or prepolymer onto a support layer, followed by a post-cure with heat or irradiation, and (5) depositing a barrier film directly from a gaseous phase monomer plasma. See Robert J. Petersen, J. of Membrane Science, 83:81-150 (1993).

Sulfonated polyfurane can be made by method (1) in which the polysulfone support layer is dip-coated with an aqueous solution containing furfuryl alcohol and sulfuric acid, and the coated support layer is then heated in an air oven at 125 to 140° C. for 15 minutes, resulting in formation of a sulfonated polyfurane rejection layer on the polysulfone support layer surface.

Method (2), which is preferred, is performed on the surface of the support layer by interacting two immiscible solutions. Each of the two solutions contains a monomer, which reacts with the other to form a polymer. See David M. Teegarden, Polymer Chemistry: Introduction to an Indispensable Science (2004). For example, as a polymer for the rejection layer, polyurea can be formed by interfacial polymerization in a reaction between polyethylenimine aqueous solution and toluene di-isocyanate hexane solution. Similarly, polyepiamine can be made by reacting polyepichlorohydrin with 1,2-ethanediamine, and poly(piperazineamide) can be made by reacting piperazine with polyfunctional acid halide such as isophthaloyl chloride, terephthaloyl chloride, trimesoyl chloride, and a combination thereof. Polyamide can be formed by interracially polymerizing a polyfunctional amine and a polyfunctional acid halide. A polyfunctional amine is an aliphatic, aromatic, heterocyclic, or alicyclic compound that has two or more primary or secondary amino groups. Examples include, but are not limited to, m-phenylenediamine, p-phenylenediamine, piperazine, 2-methylpiperazine, N,N-dimethylethylenediamine, 1,3,5-triaminobenzene, and a combination thereof. Preferably, the polyfunctional amine is dissolved in water before applied to the surface of a support layer. A polyfunctional acid halide, on the other hand, is an aliphatic, aromatic, heterocyclic or alicyclic compound having two or more acyl halide groups. Examples include, but are not limited to, isophthaloyl chloride, terephthaloyl chloride, trimesoyl chloride, 1,2,4-benzenetricarboxylic acid trichloride, and a combination thereof. Preferably, the polyfunctional acid halide is dissolved in a water-immiscible solvent, such as saturated aliphatic hydrocarbons and alicyclic hydrocarbons, e.g., n-hexane, n-octane, n-nonane, n-decane, n-undecane, n-dodecane, cyclooctane, ethylcyclohexane, 1-octene, 1-decene, ISOPAR series, and a combination thereof.

Described below are procedures of preparing a membrane of this invention. The support layer of the membrane is obtained by immersion precipitation in three steps:

First, a phase separation polymer is dissolved in a water-miscible non-aqueous solvent to obtain a casting polymer solution.

A water-miscible non-aqueous solvent is miscible with water but does not contain any significant amount of water. It can be a single solvent or a mixture of solvents. Examples include, but are not limited to, acetone, chloroform, dimethylformamide ("DMF"), dimethyl sulfoxide, dimethylacetamide, N-methylpyrrolidone ("NMP"), tetrahydrofuran, and a combination thereof. Preferably, the water-miscible solvent can contain one or more additives, e.g., polyethylene glycol and polyvinylpyrrolidone. The casting polymer solution thus obtained can be a clear solution or a slurry, containing 5-30 wt % a polymer, preferably, 7-20 wt %, and more preferably, 9-13 wt %.

Second, the casting polymer solution is extruded and spread evenly onto a rotating drum and a mesh is pulled into the casting polymer solution on the drum, forming a casting solution layer in which is embedded the mesh. The drum can be made of any suitable material, including metals (e.g., stainless steel, aluminium, aluminium alloy, and iron), and plastics (e.g., polytetrafluoroethylene, polypropylene, polyethylene, polyvinylchloride, acrylonitrile butadiene styrene, polyamide, polyoxymethylene, polycarbonate, polyphenylene oxide, polyester, and polyethylene terephthalate). Alternatively, the mesh can be pulled onto the rotating drum first, followed by spreading the casting polymer solution.

Third, the casting solution layer on the drum is rotated into a coagulation liquid to form a support layer in a continuous process. Upon contacting the coagulation liquid, the casting solution layer gels in a spongy microporous structure or finger-like microporous structure. The coagulation liquid is a liquid that is miscible with the solvent of a casting polymer solution but is a non-solvent for the polymer, and its addition to the polymer solution results in formation of a polymeric membrane. It can contain water or a mixture of water and an additive (e.g., acetone, chloroform, dimethylformamide, dimethyl sulfoxide, dimethylacetamide, N-methylpyrrolidone, tetrahydrofuran, and a combination thereof). The support layer thus formed can be cured in the coagulation liquid. During the curing process, it is continually in contact with a roller at the opposite side to that in contact with a rotating drum. This arrangement can prevent formation of a second skin. If necessary, the support layer can be rinsed with water to remove any residual solvent. Preferably, the support layer is then annealed in water at 40-90° C. to allow relaxation of polymer stress points to form a more uniform membrane.

The support layer thus prepared is asymmetric and highly porous. A pore-size gradient is formed in the support layer during the fabrication process. The side facing the air (i.e., dense side) has a smaller pore size, whereas the other side facing the roller (i.e., porous side) has a larger pore size. On the other hand, the overall porosity of the support layer is controlled by casting parameters (e.g., temperature, humidity, and speed of roller), by choices of solvents, and by polymer-solvent weight ratios in casting polymer solutions.

A rejection layer is then coated onto the dense side of the support layer by interfacial polymerization. To achieve this, the support layer is first immersed in a polyfunctional amine aqueous solution for 0.5-10 minutes and is taken out from the solution. Any extra liquid droplet is removed from the surface of the support layer. To the dense side of the support layer is applied a solution of polyfunctional acid halide in a water-insoluble solvent and is allowed to sit for 0.5-10 minutes. Interfacial polymerization takes place at the interface of the two solutions, resulting in formation of a membrane that contains a porous support layer and an ultrathin rejection layer. Optionally, the membrane is dried to remove any remaining solvent. It can also be washed with water to rinse off residual acid chloride. The membrane can further be cured in water or air at 60-90° C. for 2-20 minutes.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Example 1

A membrane of this invention was prepared following the procedures described below.

In a polyester mesh (180 mesh), 15 wt % polysulfone and 5 wt % polyvinylpyrrolidone solution in NMP was cast to a thickness of about 100 μm with a mesh. The mesh-embedded polymer solution layer was immersed in a water bath at an ambient temperature to gel the polysulfone solution, thereby obtaining a mesh-embedded-reinforced polysulfone support layer. The thus-obtained polysulfone support layer was sufficiently washed with water to remove residual NMP, and was annealed at 80° C. in water for 5 minutes.

The polysulfone microporous support layer was immersed in an aqueous m-phenylenediamine solution (2.0 wt % with 0.1 wt % sodium dodecyl benzolsulfonate) for 2 minutes and was then taken out from the solution. Extra liquid drops on the surface of the substrate were removed. A trimesoyl chloride solution (0.1 wt %) in hexane was applied to the surface of the substrate for one minute. The membrane thus prepared was washed with flowing water for 10 minutes to remove non-reacted acid chloride.

The performance of the membrane was evaluated in terms of water flux and salt rejection in a laboratory forward osmosis crossflow set-up.

The specially designed cross-flow membrane cell has a channel on each side of the membrane, which allows a feed solution and a draw solution to flow through separately. Each channel has dimensions of 4×100×40 mm for channel height, length, and width, respectively. The flow rate of cocurrent flow was controlled at 2.0 L/min by a centrifugal pump (Model 75211-67, Cole-Parmer, U.S.A.) and monitored with a flow meter (Model F-400, Blue-white Industries Ltd., U.S.A.). Heaters were used to maintain both the feed solution and the draw solution at 25° C. The solutions were stirred to keep them homogenous. A weighing scale (Model SB 16001, Mettler Toledo, Germany) connected to a computer was used to monitor the weight of water and calculate the water flux permeating through the membrane from the feed to the draw side. The draw solution was 2.0 M NaCl aqueous solution and the feed solution was water. All membranes were tested in the orientation of the dense selective side facing the feed solution (forward osmosis mode).

The water flux of a forward osmosis run was calculated by the weight changes of the draw solution divided by the water density, membrane surface area, and time of the forward osmosis run. Thus, water flux (Jw) is:

$$J_W = \frac{\Delta \text{Weight}}{\text{Water Density} \times \text{Membrane Surface Area} \times \Delta \text{Time}}.$$

To determine the NaCl rejection, the chloride concentration in the feed solution at the end of a forward osmosis run was measured by a chloride selective electrode (Model 6560-10C, Horiba, Japan). The salt rejection, R, is calculated as:

$$R = \left(1 - \frac{C_f}{C_d}\right) \times 100\%,$$

in which $C_f$ and $C_d$ are feed and draw NaCl concentrations, respectively. $C_f$=Concentration of salt in the feed solution at the end of the run×Volume of feed solution at the end of the run/Initial volume of the feed solution, and $C_d$=Initial salt concentration of the draw solution.

The membrane thus prepared was tested, showing a water flux of 15.23 GFD and a salt rejection of 99.87%. A forward osmosis membrane purchased from Hydration Technology Innovations (HTI) was tested in the same conditions. Unexpectedly, the prepared membrane of this example had a higher water flux and a higher salt rejection than the HTI membrane, which had a water flux of 15.18 GFD and salt rejection of 99.84%.

Example 2

A membrane was prepared following the same procedures described in Example 1, except that polysulfone solution was 13 wt % in NMP/DMF (70/30 by weight). The membrane was tested, showing a water flux of 15.95 GFD and a salt rejection of 99.90%. Unexpectedly, the membrane had a higher water flux and a higher salt rejection than the HTI membrane.

Example 3

A membrane was prepared following the same procedures described in Example 1, except that polysulfone solution was 12 wt % in NMP/DMF (10/90 by weight). The membrane was tested, showing a water flux of 18.11 GFD and a salt rejection of 99.93%. Unexpectedly, the membrane had a much higher water flux and a higher salt rejection than the HTI membrane.

Example 4

A membrane was prepared following the same procedures described in Example 1, except that polysulfone solution was 10 wt % in NMP/DMF (10/90 by weight). The membrane was tested, showing a water flux of 17.53 GFD and a salt rejection of 99.83%. Unexpectedly, the membrane had a much higher water flux than the HTI membrane.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A two-layered osmosis membrane comprising:
   a support layer, in which a mesh is embedded, made of a phase separation polymer; and
   a rejection layer, which adheres to the support layer, made of a thin film composite polymer,
wherein the support layer has a thickness of 50 to 200 μm, the rejection layer has a thickness of 0.05 to 3 μm, and the mesh has an open area of 30 to 70%, a mesh size of 180 mesh, and a thickness of 45 to 150 μm.

2. The membrane of claim 1, wherein the support layer has a thickness of 60 to 180 μm; the rejection layer has a thickness of 0.06 to 1 μm; and the mesh has an open area of 40 to 70%, and a thickness of 50 to 145 μm.

3. The membrane of claim 2, wherein the support layer has a thickness of 70 to 160 μm; the rejection layer has a thickness of 0.1 to 0.5 μm; and the mesh has an open area of 50 to 70%, and a thickness of 55 to 140 μm.

4. The membrane of claim 1, wherein the phase separation polymer is polyethersulfone, polyphenylenesulfone, polyphenylenesulfidesulfone, polyacrylonitrile, cellulose ester, polyphenyleneoxide, polypropylene, polyvinyledenefluoride, polyvinylchloride, polyarylsulfone, polyphenylene sulfone, polyetheretherketone, polysulfone, polyamide, polyimide, or a combination thereof; and the thin film composite polymer is polyamide, polyimide, cellulose ester, polyurea, polyepiamine, poly(piperazineamide), sulfonated polyfurane, sulfonated polysulfone, carboxylated polysulfone, or a combination thereof.

5. The membrane of claim 4, wherein the support layer has a thickness of 60 to 180 µm; the rejection layer has a thickness of 0.06 to 1 µm; and the mesh has an open area of 40 to 70%, and a thickness of 50 to 145 µm.

6. The membrane of claim 5, wherein the support layer has a thickness of 70 to 160 µm; the rejection layer has a thickness of 0.1 to 0.5 µm; and the mesh has an open area of 50 to 70%, and a thickness of 55 to 140 µm.

7. The membrane of claim 1, wherein the phase separation polymer is polysulfone.

8. The membrane of claim 7, wherein the thin film composite polymer is polyamide.

9. The membrane of claim 8, wherein the support layer has a thickness of 60 to 180 µm; the rejection layer has a thickness of 0.06 to 1 µm; and the mesh has an open area of 40 to 70%, and a thickness of 50 to 145 µm.

10. The membrane of claim 9, wherein the support layer has a thickness of 70 to 160 µm; the rejection layer has a thickness of 0.1 to 0.5 µm; and the mesh has an open area of 50 to 70%, and a thickness of 55 to 140 µm.

11. The membrane of claim 10, wherein the mesh is a monofilament mesh.

12. The membrane of claim 10, wherein the thin film composite polymer is m-phenylene trimesamide.

13. The membrane of claim 7, wherein the mesh is a monofilament mesh.

14. The membrane of claim 13, wherein the support layer has a thickness of 60 to 180 µm; the rejection layer has a thickness of 0.06 to 1 µm; and the mesh has an open area of 40 to 70%, and a thickness of 50 to 145 µm.

15. The membrane of claim 14, wherein the support layer has a thickness of 70 to 160 µm; the rejection layer has a thickness of 0.1 to 0.5 µm; and the mesh has an open area of 50 to 70%, and a thickness of 55 to 140 µm.

16. The membrane of claim 7, wherein the thin film composite polymer is m-phenylene trimesamide.

17. The membrane of claim 1, wherein the thin film composite polymer is polyamide.

18. The membrane of claim 17, wherein the support layer has a thickness of 60 to 180 µm; the rejection layer has a thickness of 0.06 to 1 µm; and the mesh has an open area of 40 to 70%, and a thickness of 50 to 145 µm.

19. The membrane of claim 18, wherein the support layer has a thickness of 70 to 160 µm; the rejection layer has a thickness of 0.1 to 0.5 µm; and the mesh has an open area of 50 to 70%, and a thickness of 55 to 140 µm.

20. The membrane of claim 17, wherein the mesh is a monofilament mesh.

21. The membrane of claim 20, wherein the support layer has a thickness of 60 to 180 µm; the rejection layer has a thickness of 0.06 to 1 µm; and the mesh has an open area of 40 to 70%, and a thickness of 50 to 145 µm.

22. The membrane of claim 21, wherein the support layer has a thickness of 70 to 160 µm; the rejection layer has a thickness of 0.1 to 0.5 µm; and the mesh has an open area of 50 to 70%, and a thickness of 55 to 140 µm.

23. The membrane of claim 22, wherein the thin film composite polymer is m-phenylene trimesamide.

24. The membrane of claim 17, wherein the thin film composite polymer is m-phenylene trimesamide.

25. The membrane of claim 24, wherein the support layer has a thickness of 60 to 180 µm; the rejection layer has a thickness of 0.06 to 1 µm; and the mesh has an open area of 40 to 70%, and a thickness of 50 to 145 µm.

26. The membrane of claim 25, wherein the support layer has a thickness of 70 to 160 µm; the rejection layer has a thickness of 0.1 to 0.5 µm; and the mesh has an open area of 50 to 70%, and a thickness of 55 to 140 µm.

27. A method for making an osmosis membrane comprising:
    applying a casting polymer solution to a mesh to form a casting solution layer that embeds the mesh, in which the casting polymer solution contains a polymer 5 to 30% by weight and a water-miscible solvent 70 to 95% by weight, the mesh having a mesh size of 180 mesh, an open area of 30 to 70%, and a thickness of 45 to 150 µm;
    coagulating the casting solution layer with a coagulation liquid to convert the casting solution layer into a support layer; and
    coating a surface of the support layer with a rejection layer by interfacial polymerization
    wherein the support layer has a thickness of 50 to 200 µm and the rejection layer has a thickness of 0.05 to 3 µm.

28. The method of claim 27, wherein the coating step is performed by interacting an aqueous polyfunctional amine solution with an anhydrous polyfunctional acid halide solution on the surface of the support layer.

* * * * *